United States Patent [19]

Schrey

[11] 3,727,058
[45] Apr. 10, 1973

[54] HYDROGEN ION DEVICE

[75] Inventor: Alfred F. Schrey, Ontario, Calif.

[73] Assignee: Hughes Aircraft Company, Culver City, Calif.

[22] Filed: Feb. 16, 1971

[21] Appl. No.: 115,453

[52] U.S. Cl. ............. 250/83.3 H, 62/514, 136/86 F, 136/153, 141/66, 141/82, 204/1 T, 204/195 S, 324/29, 324/33, 417/49, 338/18
[51] Int. Cl. ........ G01t 1/16, B01k 3/00, G01n 27/62
[58] Field of Search .................. 204/195 S, 1 R, 1 T; 136/86 F, 153; 62/514; 141/7, 8, 65, 66, 82; 417/48, 49; 313/7, 101; 250/83.3 H; 324/33, 29; 338/18

[56] References Cited

UNITED STATES PATENTS

| 3,410,780 | 11/1968 | Holden | 204/195 S |
|---|---|---|---|
| 3,066,222 | 11/1962 | Poorman et al. | 62/514 X |
| 3,180,989 | 4/1965 | Hand et al. | 250/83.3 |
| 3,371,145 | 2/1968 | Camille | 62/514 X |

FOREIGN PATENTS OR APPLICATIONS

| 713,149 | 7/1965 | Canada | 136/153 |

Primary Examiner—G. L. Kaplan
Attorney—W. H. MacAllister, Jr. and Allen A. Dicke, Jr.

[57] ABSTRACT

A dihydrogen orthophosphate salt crystal body, either $KH_2PO_4$ or $NH_4H_2PO_4$, is provided with a hydrogen transparent metal coating on opposing surfaces, and is protected on the remaining surfaces with a protective insulator coating. When the metal coated surfaces are in contact with gas mixtures having different hydrogen partial pressures, current flow between the metal coatings and hydrogen ion flow through the salt body are directly related. Thus, when connected to a power supply, the salt body acts as a hydrogen pump.

8 Claims, 4 Drawing Figures

3,727,058

Alfred F. Schrey,
INVENTOR.
BY.

ALLEN A. DICKE, Jr.,
AGENT.

Alfred F. Schrey,
INVENTOR,
BY.

ALLEN A. DICKE, Jr.,
AGENT

HYDROGEN ION DEVICE

BACKGROUND

This invention is directed to the employment of either of the dihydrogen orthophosphate salts $KH_2PO_4$ or $NH_4H_2PO_4$ with metal electrode coatings on opposing faces to relate electric current to hydrogen ion flow through the salt.

Insulation from ambient heat loads at cryogenic temperatures is often provided by a Dewar. A Dewar is an evacuated vessel, wherein the vacuum prevents convective or conductive heat flow. Dewars are often built of glass and are silvered to minimize the radiation effects. However, in some environments, glass Dewars are unsatisfactory because of their fragile nature. Stainless steel is a desirable Dewar material, because it is not embrittled at cryogenic temperatures. However, stainless steel is transparent to hydrogen at elevated temperatures, for example 500° F, and it contains hydrogen which outgasses at room and cryogenic temperatures into the vacuum space. Thus, while stainless steel is less subject to catastrophic failure, the hydrogen outgassing problem prevents it from being employed in a sealed system.

Glass Dewars are usually sealed for life, but due to the outgassing problem of the material, pumpout systems are normally connected to stainless steel Dewars. The pumpout is then conventionally accomplished by a combination of a diffusion pump and a fore pump, or by an ion pump. Ion pump systems include high voltage power supplies which are weighty and clumsy. Thus, ion pump systems are not useful in cases where maximum safety and minimum weight are desired.

SUMMARY

In order to aid in the understanding of this invention, it can be stated in essentially summary form that it is directed to a hydrogen ion device which incorporates a dihydrogen orthophosphate salt body selected from the group consisting of $KH_2PO_4$ and $NH_4H_2PO_4$, with metal electrodes coated on opposite faces with the electrodes electrically connected. The salt body is positioned so that hydrogen ions passing from one electrode coated face to another are related to current flow between the electrodes.

Accordingly, it is an object of this invention to provide a hydrogen ion device which relates hydrogen ion passage therethrough to current. It is a further object to employ dihydrogen orthophosphate salts and connect them so that hydrogen ions pass therethrough in relationship to external current between electrodes coated on opposing salts faces. It is another object to connect a power supply to such a crystal body to drive hydrogen ions therethrough to transport them from one volume to another. It is still another object to connect a voltmeter thereto to determine the differential hydrogen partial pressure between the volumes on opposing faces of the salt body. It is still another object to connect a load so that the salt body provides current to power the load. It is a further object to provide such a salt which is specific to hydrogen ions so that hydrogen ions are ionized in the salt. It is still another object to provide a dihydrogen orthophosphate salt which has specific hydrogen ion activity. It is a further object to employ a potassium dihydrogen orthophosphate or ammonium dihydrogen orthophosphate salt.

Further objects and advantages of this invention will become apparent from a study of the following portion of the specification, the claims, and the attached drawings.

DESCRIPTION

Figure 1:
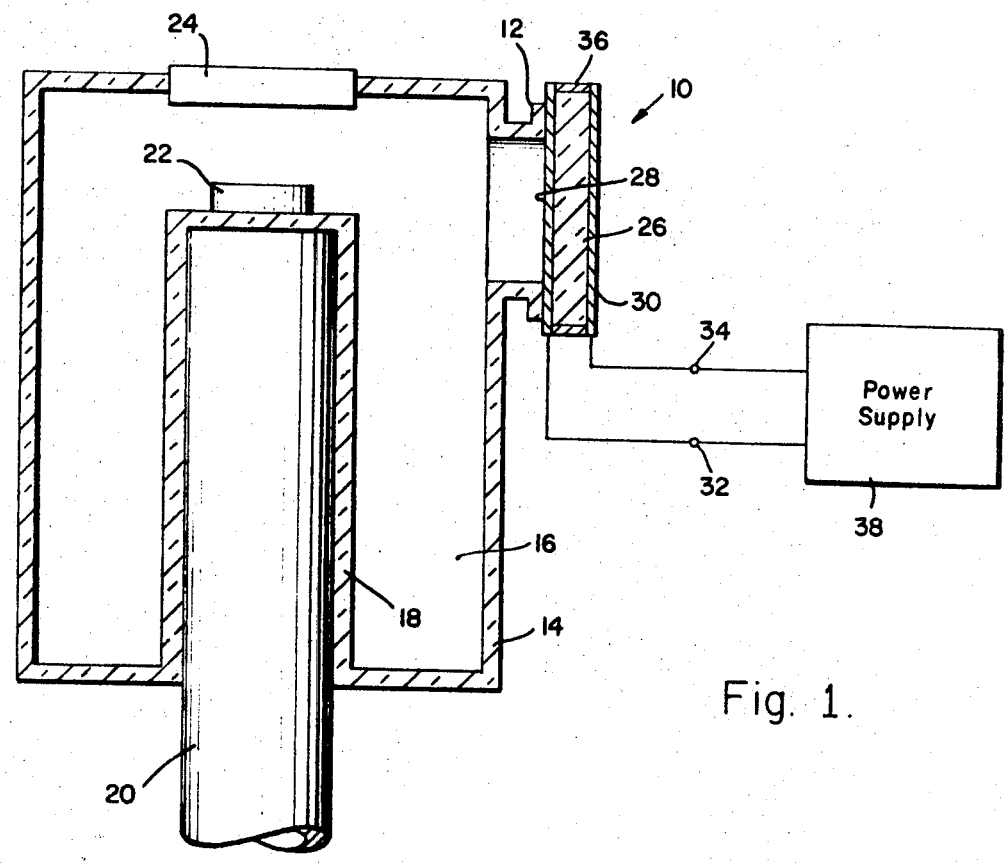
FIG. 1 is a schematic drawing, partly in longitudinal section, showing the hydrogen ion device installed as a hydrogen pump in a stainless steel Dewar.
Figure 2:
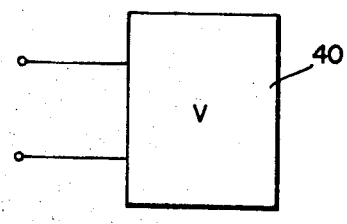
FIG. 2 shows a voltmeter which can be connected to the structure of FIG. 1 to determine the hydrogen partial pressure in the stainless steel Dewar.

In FIG. 1, the preferred embodiment of the hydrogen ion device is generally indicated at 10. The device 10 is positioned on flange 12 of Dewar 14. Dewar 14 is conventionally otherwise closed, and is evacuated by conventional means. Dewar 14 is made of 304L stainless steel, or may be a container made of other hydrogen outgassing materials, and as such, is fairly impervious to the migration of atoms therethrough, except for its transparency to hydrogen at elevated temperatures, such as 500° F. Thus, Dewar 14 defines a closed, evacuated chamber 16. Tube 18 forms part of the Dewar wall and extends into chamber 16. It contains cold finger 20 which conventionally provides refrigeration at cryogenic levels at the upper end, as seen in this FIGURE. Detector 22 is positioned within chamber 16 at a position where it receives cooling from the cold finger, and where it faces radiation window 24. In a specific example, detector 22 is sensitive to infrared radiation, and window 24 is transparent thereto. Suitable optics are provided. On the other hand, instead of the placement of detector 22 at the refrigerator point, some other type of device which requires cryogenic refrigeration could be located at that point.

Maintenance of a suitable vacuum in chamber 16 is essential to adequate insulation to prevent excessive heat load to the cold finger to thus overload the refrigeration system and prevent it from reaching the desired low temperature. In order to maintain the hydrogen partial pressure within chamber 16 at a sufficiently low value, in view of the hydrogen outgassing of the stainless steel of Dewar 14, the hydrogen ion device 10 is provided.

Device 10 comprises a salt crystal body 26 which is either a potassium dihydrogen orthophosphate or an ammonium dihydrogen orthophosphate. Opposite faces of the salt body 26 carry electrodes 28 and 30 which are respectively connected to terminals 32 and 34. Electrodes 28 and 30 are palladium or gold, vapor-deposited onto the surface of the salt body. The vapor-deposited metal electrode coating is in the order of 4–10 microinches thick so that it does not interfere with the transmissability of hydrogen therethrough. On the other hand, it is sufficiently thick to protect the salt body from water vapor. The recited salts are hygroscopic.

In order to further protect the salts from adsorption of water vapor, the edges of the salt body which are not protected by the metal electrodes are coated with an insulative protective coating 36. This coating is preferably an oxide coating sputtered onto the surface. It may be quartz or alumina.

The nature of salt body 26 is that it is a crystalline material. A polycrystalline structure of salt body 26 may be satisfactory in some cases, but best results are obtained with single crystal structure, which are thus preferred. The salt body can be pure, can have intrinsic impurities, or can be doped with $SO_4$ ions. Doping increases hydrogen ion conductivity and is thus preferred.

The salt body 26 is positioned over flange 12 and power supply 38 is connected. Terminal 34 is made negative by from 2 to 6 volts with respect to terminal 32, to apply an electric field to hydrogen ions in the salt. For an active area of 1 centimeter square of the salt body and a salt body thickness of 0.1 centimeter, resistance is about 20 megohms and, at 4 volts, about $1.1 \times 10^{12}$ protons per second are pumped. This corresponds directly to the current of 0.2 microamperes.

The physical action by which the pumping takes place is the motion of protons through the device in vacancy motion. Ionization of a hydrogen atom at or adjacent the surface of the crystal is easily accomplished. The dielectric constant of the salt screens the hydrogen so that the ionization energy is effectively considerably smaller. Thus, the hydrogen atom is automatically ionized in the crystal. The energy of the atom is associated with adjacent crystal structure to reduce the effective ionization potential from about 13 ev to about 0.1 ev. Thus, the proton is found in the salt, ready for transport under the influence of the electrical field. As long as the electric field is applied and hydrogen is present on the positive side of the salt body, pumping takes place. Partial pressures of hydrogen within chamber 16 down to about $10^{-10}$ to a theoretical lower limit of $10^{-18}$ torr are possible in a Dewar having about 100 square centimeters of stainless steel wall.

When the power supply 38 is disconnected from terminals 32 and 34, and voltmeter 40 is connected to those terminals, the voltage read on the voltmeter 40 is an indication of the differential hydrogen partial pressure across the device, so that the device thus becomes a differential hydrogen partial pressure gauge. The equation describing the behavior is:

$$V = -(RT/nF) + 1n(P_{outside}/P_{inside})$$

$F$ = Faraday equivalent
= 96,500 coulombs (gram equivalent)
= 23,000 calories

Where:
$n$ = number of equivalents
$P$ = Pressure
$R$ = Gas constant (calories/°C/mole)
$T$ = Temperature.

The voltmeter can be alternately connectable to the same device, or can be connected to a separate device 10 which has the sole function to indicate the differential partial hydrogen pressure.

Figures 3, 4:
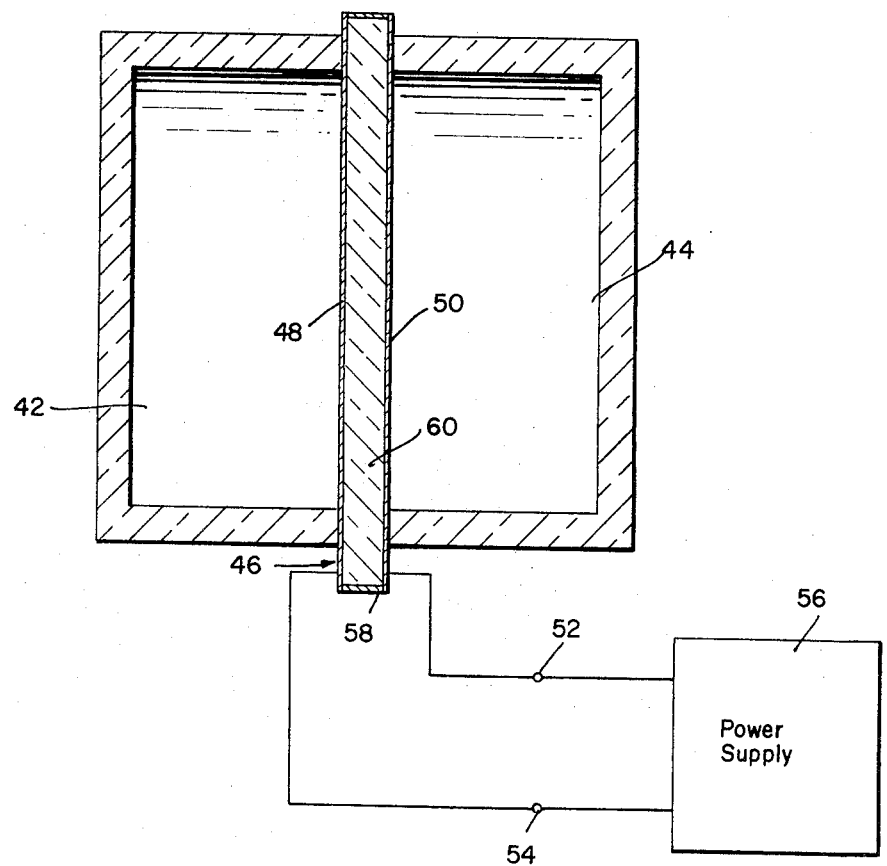
FIG. 3 shows a hydrogen ion device positioned between two chambers, with a power supply connected to differentially pump hydrogen, so that it can be employed as a means for controlling the relative amount of hydrogen in the two chambers.
FIG. 4 schematically illustrates a load which can be connected to the device of FIG. 3 so that the hydrogen ion device of FIG. 3 can act as a battery.

Referring to FIGS. 3 and 4, chambers 42 and 44 are positioned on opposite sides of device 46. Device 46 is also a hydrogen ion device, comprised of the same salt material as described above. Furthermore, it has electrodes 48 and 50 on opposite faces, respectively facing the chambers 42 and 44. The electrodes are respectively electrically connected to terminals 52 and 54 to which are also connected power supply 56. The edges of device 46 are protected by insulator 58 which is opaque to water vapor, to prevent hygroscopic failure of the salt body 60.

In this case, application of an electric field across electrodes 48 and 50 produces a pumping of hydrogen ions from one chamber to the other, with the resultant development of a differential hydrogen partial pressure. This can be employed as a gas mixer to introduce an accurately controlled amount of hydrogen into a chamber.

On the other hand, the structure of FIG. 3 can be employed to differentially pump deuterium, tritium, and hydrogen. The crystal 60 is specific to tritium and deuterium, as well; they ionize in the crystal, but the conductivity of the deuterium ion, tritium ion, and hydrogen ion are different from one another, so that the hydrogen can be pumped out of the volume, leaving the deuterium and tritium behind.

When the power supply 56 is disconnected from terminals 52 and 54, but load 62 is connected to these terminals, the structure of FIG. 3 becomes a battery. As hydrogen seeks to equalize its partial pressure between the two chambers, current is produced. This current amounts to 0.01 amperes per square meter at 5 volts, when the device 46 is 1 millimeter thick. More current would result from a thinner crystal.

This invention having been described in its preferred embodiment, and several applications having been disclosed, it is clear that it is susceptible to numerous modifications and embodiments within the ability of those skilled in the art and without the exercise of the inventive faculty.

I claim:

1. A hydrogen ion device for receiving hydrogen and ionizing the received hydrogen and transporting the ionized hydrogen, said hydrogen ion device comprising:
    a salt body having first and second faces, said salt body being selected from the group consisting of potassium dihydrogen orthophosphate and ammonium dihydrogen orthophosphate;
    first and second metallic electrodes coated onto said first and second opposing faces of said salt body;
    a Dewar, walls defining an insulation space within said Dewar, one of said walls of said Dewar being made of hydrogen outgassing material, said salt body being positioned in one of said walls of said Dewar and having one of said metallic electrodes facing said insulating space within said Dewar; and
    electric means connected to said first and second electrodes so that, as hydrogen ions are transported through said salt body, flow of current through said electric means is related to the hydrogen ion flow.

2. The hydrogen ion device of claim 1 wherein said electric means is a power supply for supplying an electric field between said first and second electrodes to remove hydrogen ions from said Dewar so that the partial pressure of hydrogen within said Dewar is lower than ambient hydrogen partial pressure.

3. The hydrogen ion device of claim 2 wherein refrigerator means is associated with said Dewar to provide refrigeration at a point in said Dewar, and an electronic device subject to refrigeration is positioned within said chamber means in said Dewar at said refrigerated point.

4. The hydrogen ion device of claim 3 wherein said electronic device is an infrared detector, and an infrared window is provided in said Dewar to permit transmission of infrared radiation to said detector.

5. The hydrogen ion device of claim 1 wherein said electric means is a voltmeter so that the differential partial pressure of hydrogen between said Dewar and the ambient is indicated.

6. The hydrogen ion device of claim 5 wherein refrigerator means is associated with said Dewar to provide refrigeration at a point in said Dewar, and an electronic device subject to refrigeration is positioned within said Dewar at said refrigerated point.

7. The hydrogen ion device of claim 6 wherein said electronic device is an infrared detector, and an infrared window is provided in said Dewar to permit transmission of infrared radiation to said detector.

8. The hydrogen ion device of claim 1 wherein said chamber has metallic walls.

\* \* \* \* \*